Figure 1:
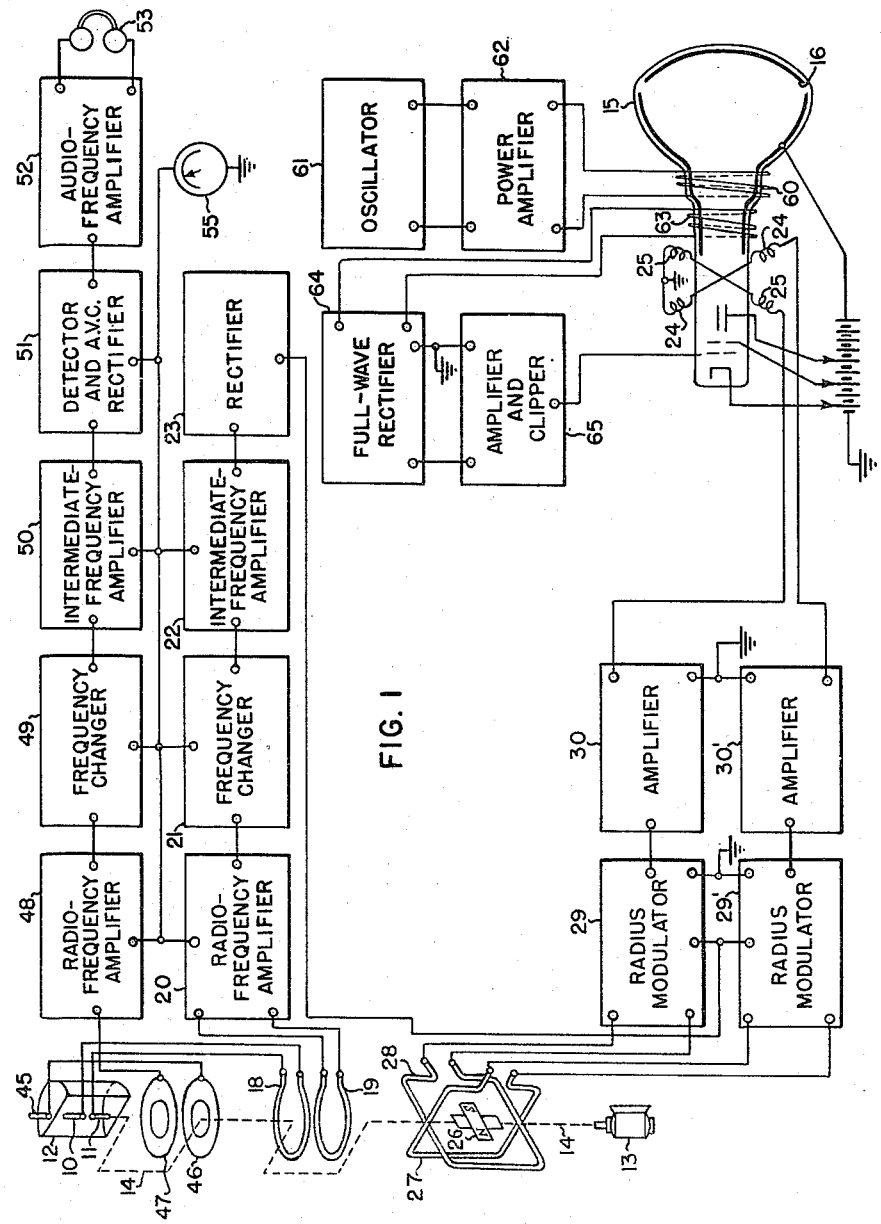

INVENTOR:
JAMES F. CRAIB,
BY Harry C. Page
ATTORNEY.

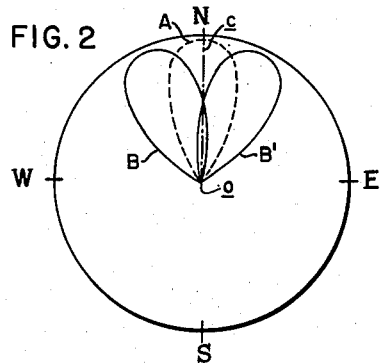
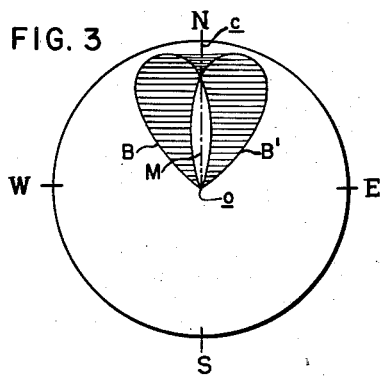
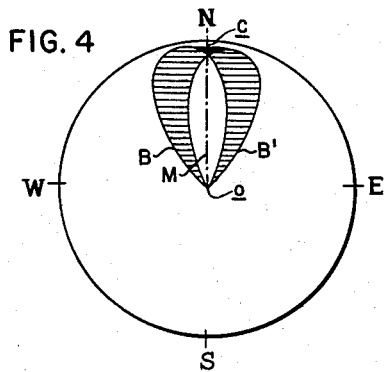
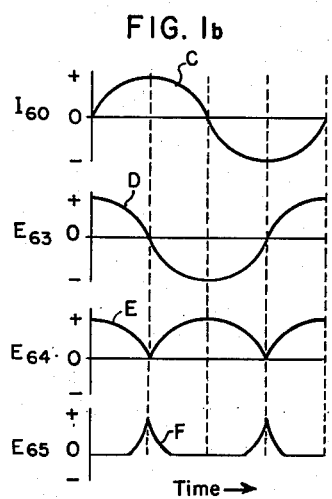
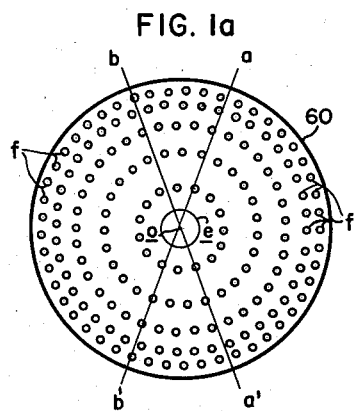

Patented Dec. 2, 1947

2,431,990

UNITED STATES PATENT OFFICE 2,431,990

CATHODE-RAY DEVICE FOR INDICATING THE AXIS OF A SYMMETRICAL SIGNAL

James F. Craib, Flushing, N. Y., assignor, by mesne assignments, to Hazeltine Research, Inc., a corporation of Illinois Original application September 20, 1943, Serial No. 503,073. Divided and this application October 2, 1945, Serial No. 619,755

10 Claims. (Cl. 315—24)

This invention is directed to cathode-ray type indicating arrangements for sharply indicating the axis of symmetry of an applied substantially symmetrical signal. The invention is subject to a variety of applications but it will be described in detail in connection with a radiated-signal direction finder. The direction finder to be considered forms the subject matter of a copending application Serial No. 503,073, filed September 20, 1943, in the name of James F. Craib, from which this application has been divided.

For some purposes it is highly desirable that a radiated-signal direction finder provide a quick, accurate and readily discernible direction or bearing indication with complete freedom from the necessity of manipulation of control elements when the device is in operation. The signals which are received from a radio transmitter by a direction finder are often short in duration so that the response of the direction finder must be quick and reliable in order that the direction of reception of the received signal can be precisely determined during the short intervals of transmission.

Prior art arrangements have been proposed which provide a direction indication by the use of line-tracing devices or indicating arrangements which generate intersecting lines or patterns in such a manner that a crossover point in the lines or patterns designates the direction of the received signal. A representative device of this character forms the subject matter of United States Letters Patent 2,407,281, granted September 10, 1946, to John Kelly Johnson et al. and assigned to the same assignee as the present invention. Direction finders of the type mentioned above have proved generally satisfactory, but it has been discovered that substantially the same result can be accomplished by the present invention with a more simple circuit arrangement.

It is, therefore, an object of the invention to provide an improved and simplified cathode-ray type indicating arrangement especially suited for use in a radiated-signal direction finder of the type under consideration.

It is another object of the invention to provide an improved cathode-ray type indicating arrangement for sharply indicating the axis of symmetry of an applied and substantially symmetrical signal.

In accordance with the invention, a cathode-ray type indicating arrangement comprises a cathode-ray tube line-tracing device and means for normally controlling the cathode ray of the device to trace a predetermined line. The arrangement includes means responsive to the amplitude of an applied signal having an axis of substantial symmetry for shifting the line traced by the line-tracing device in accordance therewith to trace a signal pattern having a corresponding axis of substantial symmetry. Additionally, the system includes means for producing a magnetic field for cyclically effecting equal and opposite incremental displacements of any signal pattern traced by the line-tracing device to cause the device to trace a pair of intersecting patterns the intersections of which sharply indicate the aforesaid axis of symmetry. The magnetic field is so produced as to have the same law of distribution over areas which are symmetrically spaced on opposite sides of the axis of symmetry indicated by any of the traced signal patterns and in which areas the incremental displacements are effected.

For a better understanding of the present invention, together with other and further objects thereof, reference is had to the following description taken in connection with the accompanying drawings, and its scope will be pointed out in the appended claims.

In the accompanying drawings, Fig. 1 is a schematic representation of a radiated-signal direction finder including an indicating arrangement in accordance with the present invention; Fig. 1a represents a field distribution and Fig. 1b comprises curves used in describing the operation of the direction finder of Fig. 1; and Figs. 2, 3 and 4 individually illustrate direction-indicating patterns which may be produced by the indicating arrangement of Fig. 1 to provide a bearing indication of a received signal.

Referring now more particularly to Fig. 1 of the drawings, the radiated-signal direction finder there represented comprises a receiving pick-up, or antenna, system having a directive pattern in space. This pick-up system is provided by a dipole antenna 10, 11 and a reflector 12. The direction finder includes means for controlling the pick-up system to cause its directive pattern to rotate, such means comprising a motor 13 mechanically coupled, as indicated by the broken line 14, to the antenna system 10, 11 and its associated reflector 12. The signal output of antenna system 10, 11 is applied to a first receiving system through a pair of inductively-coupled loops 18 and 19, loop 19 being stationary and loop 18 being driven about its axis by motor 13, as indicated by the broken line 14, with the antenna system 10, 11 and its associated reflector 12. The receiving system which is thus coupled to antenna system 10, 11 comprises, in cascade, a radio-frequency amplifier 20 of one or more stages, a frequency changer or oscillator-modulator 21, an intermediate-frequency amplifier 22 of one or more stages, and a rectifier 23.

The arrangement represented in Fig. 1 also embodies an indicating arrangement in accordance with the present invention. It includes a cathode-ray tube line-tracing device 15 having suitable beam-deflecting means for controlling the cathode-ray beam of the device to trace a predetermined line on a target electrode, or fluorescent screen 16. Such beam-deflecting means may be of any known type but, as shown, comprise a pair of windings 24, 24 and 25, 25 arranged in a conventional manner to deflect the beam of device 15 in two directions normal to each other. The fluorescent screen 16 is preferably of the long persistence type to cause the patterns traced thereon, in a manner completely described hereinafter, to be sustained and clearly definite. The observation end of tube 15 is provided with a suitable compass scale to facilitate obtaining direct bearing indications from the pattern produced on screen 16. Such a compass scale is shown in Fig. 2.

The direction finder is also provided with means for normally controlling the cathode ray of device 15 to trace the aforementioned predetermined line in synchronism with the rotation of the directive pattern of antenna system 10, 11. This means includes a voltage-generating device, such as a permanent magnet 26, rotated about its axis in synchronism with the antenna rotation by motor 13, as indicated by the broken line 14. Magnet 26 rotates within a pair of stationary, angularly disposed windings 27 and 28 preferably having a space-quadrature relationship. The signals induced in windings 27 and 28, to be described more particularly hereinafter, are applied to beam-deflecting windings 24, 24 and 25, 25, respectively, normally to control the beam of tube 15 synchronously with the antenna rotation, these signals being applied to such deflecting windings through radius modulators 29' and 29 and amplifiers 30' and 30, respectively.

One input circuit of each radius modulator 29 and 29' is coupled to the output circuit of rectifier 23 included in the aforedescribed receiving system, thereby to provide means responsive to the amplitude of a signal received by the rotating pick-up system 10, 11 for shifting the line traced by line-tracing device 15 in accordance therewith.

Since the antenna system 10, 11 has a directive pattern in space, the orientation of which varies relative to the direction of reception of a desired signal, the amplitude of the signal applied to the receiving system consisting of units 20-23, inclusive, varies in accordance with this relative orientation and also in accordance with the amplitude or field strength of the radiated signal being received. In order substantially to eliminate the amplitude variations of the received signal which are attributable to variations of the field strength of the radiated signal, a control system is provided for the receiver just described. This control system forms the subject matter of application Serial No. 423,516, filed December 18, 1941, in the name of Harold A. Wheeler and assigned to the same assignee as the present invention, and comprises a second antenna system 45 having a radiation pattern which is much less directive than that of the first antenna system 10, 11. Preferably, antenna system 45 is non-directive and, as illustrated in the drawings, comprises a vertical conductor mounted on the reflector 12, for rotation therewith. This antenna system is capacitively coupled through a rotating plate 46 and a stationary plate 47 to the input circuit of a separate receiving channel designed to derive a control effect which varies primarily in accordance with the amplitude or field strength of the radiated signal being received. This last-named channel comprises, in cascade, a radio-frequency amplifier 48 of one or more stages, a frequency changer or oscillator-modulator 49, an intermediate-frequency amplifier 50 of one or more stages, a detector and automatic volume control or A. V. C. rectifier 51, an audio-frequency amplifier 52 of one or more stages, and a signal-reproducing device 53. A voltage from the A. V. C. rectifier in unit 51 is applied to one or more of the tubes of stages 48, 49 and 50 to maintain the amplitude of the signal input to detector 51 within a relatively narrow range for a wide range of received signal intensities. Additionally, the A. V. C. rectifier in unit 51 is utilized to control the gain of stages 20, 21 and 22 to maintain the amplitude of the signal input to rectifier 23 within a relatively narrow range for a wide amplitude range of the radiated signal which is being received. A suitable tuning indicator is preferably provided for the two receivers 20-23, inclusive, and 48-53, inclusive, which may comprise a high resistance voltmeter 55 coupled across the A. V. C. source of unit 51.

The radiated-signal direction finder also comprises means for providing an alternating magnetic field for cyclically effecting equal and opposite incremental displacements of any directive pattern traced by line-tracing device 15 to cause that device to trace a pair of intersecting patterns such that the intersections of those patterns on the fluorescent screen 16 sharply indicate the direction of reception of the received signal. This means comprises a winding 60 included as an element of a tuned circuit and preferably disposed about the neck portion of cathode-ray tube 15 between the deflecting windings 24, 24 and 25, 25 and the fluorescent screen 16. Winding 60 is energized by oscillations having a sinusoidal wave form supplied thereto from an oscillator 61 by means of a power amplifier 62. The frequency of the exciting oscillations, as will become apparent hereinafter, determines the frequency at which the traced directive pattern is cyclically displaced. Preferably, the operating frequency of oscillator 61 is so adjusted that the displacement frequency is high with reference to the rotational frequency of antenna system 10, 11.

The embodiment of the invention under consideration further includes means for deriving a control effect having a predetermined frequency relation with reference to the cyclical displacement of the directive pattern traced by line-tracing device 15. Preferably, the control effect has a frequency corresponding to twice the frequency of such cyclical displacement and is utilized to control the brightness of predetermined portions of the pattern traced on screen 16. The means employed in deriving this control effect comprises a pick-up winding 63, positioned coaxially with and in abutting relationship to winding 60 so as to be inductively coupled thereto. Winding 63 is coupled to the control electrode of cathode-ray tube 15 through a full-wave rectifier 64 and an amplifier and clipper 65.

In considering the operation of the described direction finder, let it be assumed initially that motor 13 is rotating the antenna system 10, 11 with its associated reflector 12 and magnet 26 about their respective axes and that no radiated signal is being intercepted by the antenna system. For this condition no signal output is obtained from rectifier 23 of the first-described receiver. However, the rotation of magnet 26 induces in each of windings 27 and 28 signals having a sinusoidal wave form and a frequency corresponding to that of the antenna rotation. These induced signals, due to the space-quadrature relationship of windings 27 and 28, have a time-quadrature relationship or a 90-degree relative time-phase displacement. The application of these induced signals through radius modulators 29 and 29' and amplifiers 30 and 30' to the beam-deflecting windings 24, 24 and 25, 25 of line-tracing device 15 causes the cathode ray of device 15 normally to trace a predetermined line, specifically a circular line, in synchronism with the rotation of the antenna directive pattern. However, when no signal is applied to radius modulators 29 and 29' from rectifier 23, as for the operating condition under consideration, the radius modulators are substantially blocked so that the beam of tube 15 develops a spot or a very small circle near the center of screen 16 and is substantially unaffected by the alternating magnetic field produced by winding 60, more fully described hereinafter.

Now let it be assumed that in the rotation of antenna system 10, 11 a radiated signal is intercepted thereby and that a direction, or bearing, indication of the received signal is desired. Since antenna system 10, 11 is continuously rotating, the received signal is amplitude-modulated in accordance with the antenna directional characteristic and this signal is translated in the first-described receiver, thereby to derive in the output circuit of rectifier 23 a unidirectional signal having amplitude variations which represent the antenna directive pattern. The signal output of rectifier 23 is applied to radius modulators 29 and 29' to modulate the energizing signals applied to beam-deflecting windings 24, 24 and 25, 25 from windings 27 and 28, respectively. Neglecting for the moment the influence of winding 60, the effect of this modulation is to shift the line, or vary the radius of the circle, normally traced by the beam of line-tracing device 15 in accordance with the amplitude variations of the signal output from rectifier 23 to trace the directive pattern of antenna system 10, 11. Such a directive pattern is illustrated by broken-line curve A of Fig. 2.

A direction indication of the received signal is produced by this pattern, the indication comprising a radial line which may be constructed from the center o of screen 16 to the crest of trace A. In the present case where the antenna system 10, 11 is assumed to have symmetrical directive characteristics, the direction indication represented in Fig. 2 by radial line o—c is the axis of symmetry of trace A and shows the received signal to have a bearing of due north.

The precise location of crest c of curve A is not easily ascertained. However, in accordance with the present invention, the beam-displacing arrangement including winding 60 is effective to produce a pair of intersecting directive patterns, as distinguished from the single trace A. Furthermore, this arrangement is characterized by the fact that the intersections of these directive patterns fall along radial line o—c and thus sharply indicate the direction of reception, or bearing, of the received signal.

Considering now specifically the influence of winding 60 on the described operation of line-tracing device 15, it will be seen that the excitation of this winding by oscillator 61 establishes an alternating magnetic field within tube 15. At a particular instant this field has the distribution with reference to the aforedescribed circular path normally traced by the electron beam of tube 15, as represented schematically in Fig. 1a. In this figure, such circular path of the electron beam is indicated e and the field of winding 60 is represented conventionally by the small dots f. It will be apparent that the magnetic field f has a uniform angular distribution about the center o of circular line e. See, for example, the field distribution within the equiangular sectors defined by radial lines o—a, o—b and o—a', o—b', respectively. This distribution assures that the beam of tube 15 is subject to substantially the same value of field strength for equal displacements in any radial direction from its circular path e. The effect of field f is to impart a helical twist to the electron beam with each alternation or half cycle of the oscillations applied to winding 60, thereby periodically to displace the beam equal and opposite increments at a frequency corresponding to that of the oscillations supplied by oscillator 61.

In the preferred embodiment of the invention under consideration it is found desirable to suppress the beam of line-tracing device 15 during the periodic displacement thereof except for the brief intervals when the beam has its maximum displacement. This is accomplished by the control effect applied to the control electrode of line-tracing device 15 from winding 63, full-wave rectifier 64, and amplifier and clipper 65. The operation of this feature of the direction finder is illustrated by the curves of Fig. 1b. In this figure curve D represents the oscillations induced in winding 63 in response to the excitation of twisting winding 60 by oscillations represented in the curve C, the induced oscillations lagging the exciting oscillations by 90 degrees. Unit 64, by rectification of the oscillations induced in winding 63, derives an output signal as shown by curve E. This signal output is shaped, amplified and reversed in polarity in unit 65 to develop a control effect or potential for application to the control electrode of line-tracing device 15 comprising positive pulses as represented by curve F. From a comparison of curves C and F, it will be seen that the derived control pulses have a frequency corresponding to twice the frequency of the exciting oscillations applied to winding 60. Additionally, the derived control pulses occur in time phase with the peaks of the exciting oscillations applied to winding 60. Due to this phase relation, the cathode ray of line-tracing device 15, which is normally blocked, is energized only during intervals when the beam receives its maximum displacement under the control of twisting winding 60.

When the normal path e of the beam of line-tracing device 15 is modified in accordance with the signal output of rectifier 23, winding 60 in cooperation with the described rectifier circuit 64 develops two intersecting patterns B and B' illustrated by the full-line curves of Fig. 2. Curves B and B' individually represent the directive pattern of antenna system 10, 11 and have substantially equal and opposite displacements from curve A produced in the absence of the beam-displacing arrangement including winding 60. By virtue of such equal and opposite displacements, the intersections of traces B and B' fall along the above-mentioned direction indication o—c and thus afford a precise and easily discernible direction indication of the received signal.

While curves B and B' are shown in full-line construction, in reality they comprise a series of interrupted or broken lines due to the periodic displacement of the beam of line-tracing device 15 and the blocking of this device except during intervals of maximum beam displacement. However, since the displacement frequency is high with reference to the frequency of antenna rotation, the long persistence of the fluorescent material of screen 16 causes the curves to have the appearance of continuous lines or traces as represented.

The magnetic field established by winding 60 has thus far been described as having a uniform angular distribution about the center of the circular line e (Fig. 1a). Since the produced direction indication comprises a radial line o—c, this field may likewise be described as having the same law of distribution over areas, symmetrically spaced on opposite sides of the direction indication of any traced directive pattern, in which areas the incremental beam displacement is effected. Even though the antenna system 10, 11 does not have perfect symmetry with reference to any particular axis, in general, the direction indication will be found to comprise a radial line, as o—c already described. The invention may be utilized in such a case by providing a magnetic field having the aforedescribed distribution with reference to the direction indication of any traced pattern for effecting equal and opposite cyclical displacements of the beam.

In a modification of the invention, a rectangular-wave exciting means may be employed in lieu of the sine-wave oscillator 61 and the power amplifier 62 to displace the directive pattern with a sudden or snap action, thereby rendering unnecessary the means for providing the previously mentioned control effect to suppress the beam of the cathode-ray tube.

Patterns of different configuration may be traced by the described direction finder, each of which provides a visual indication of the direction of reception of a received signal. The outline and general appearance of these patterns will depend, among other factors, on the directive characteristic of the antenna 10, 11, the frequency and amplitude of the oscillations applied to winding 60, and the nature of the control effect or bias applied to the grid of cathode-ray tube 15.

In Fig. 3 there appear two directive patterns or response curves having a single overlapping area M. In producing these curves a smaller current is utilized in the winding 60 than that used to obtain the curves of Fig. 2, the decreased current reducing the angular displacement of corresponding portions of the intersecting patterns. When a fixed operating bias is applied to the cathode-ray tube 15, and the units for deriving the described control effect including pick-up coil 63 are omitted, the electron beam has constant intensity during the tracing of the intersecting patterns. Accordingly, the outer edges, as well as the inner areas of the pattern, appear luminous with the exception of the narrow overlapping area M which remains dark since it is not sensitized by the beam. This narrow, pointed dark space is aligned with the direction of the incoming signal and designates the bearing thereof.

Another modified pattern is illustrated in Fig. 4 derived by still further reducing the current in winding 60. The pair of antenna response curves included in this modified pattern have a considerable overlapping area comprising a central dark portion 0. This dark area extends in the direction of the received signal, and the tip of the intersecting patterns is more brightly illuminated, the contrast thereof thus providing a convenient reference point to secure a direction indication.

If desired, when a rectangular-wave exciting means is utilized to excite winding 60, as hereinbefore suggested, the operating frequency thereof may be adjusted to half the rotational frequency of antenna system 10, 11. In such a case, line-tracing device 15 will again produce the described pair of intersecting patterns B and B', one such pattern being completely traced in a single rotation of the antenna system. For this suggested operation the long persistance screen 16 may be relied upon effectively to produce intersecting patterns, the intersections of which sharply indicate the desired signal bearing. It will be understood that the expression "means for cyclically effecting equal and opposite incremental displacements of any directive pattern traced by the line-tracing device," as utilized in the appended claims, is intended to include this operation of the direction finder.

Furthermore, the deflecting elements provided for cathode-ray tube 15 need not necessarily cause the electron beam normally to traverse a circular path. It will be apparent that in a modified arrangement the beam may be controlled normally to trace a line laterally across the screen of the tube. In such a modification, however, winding 60 will be replaced by suitable means for providing a magnetic field having the aforedescribed distribution with reference to the direction indication producted by any directive pattern normally traced by the line-tracing device for cyclically effecting equal and opposite incremental displacements of the traced directive pattern.

The cathode-ray indicating arrangement of Fig. 1 has been particularly described in association with an antenna system having a symmetrical directive pattern. It will be evident that in the reception of a radiated signal, the output signal of rectifier 23 represents this directive pattern and accordingly has an axis of substantial symmetry. The signal pattern traced by cathode-ray tube 15 in response to the output of rectifier 23 has a corresponding axis of symmetry, indicated o—c in the drawing and representing the axis of desired bearing indication as well as the axis of symmetry of the signal output of rectifier 23. It will be further apparent that the oscillations generated by oscillator 61, which have a high frequency as compared with the antenna rotation, have a periodicity short with respect to the period of the signal derived in rectifier 23 during intervals of wave-signal reception.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A cathode-ray type indicating arrangement comprising, a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, and means for producing a magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected.

2. A cathode-ray type indicating arrangement comprising, a cathode-ray tube line-tracing device, means for normally controlling the cathode ray of said device to trace a circular line, means responsive to the amplitude of an applied signal having an axis of substantial symmetry for shifting the line traced by said device in accordance therewith to trace a signal pattern having a corresponding axis of substantial symmetry, and means for producing a magnetic field for cyclically effecting equal and opposite incremental displacements of any signal pattern traced by said device to cause said device to trace a pair of intersecting patterns the intersections of which sharply indicate said axis of symmetry, said magnetic field having a uniform angular distribution about the center of curvature of said circular line.

3. A cathode-ray type indicating arrangement comprising a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, and means for producing a magnetic field for cyclically effecting equal and opposite incremental displacements of any signal pattern traced by said device with a periodicity short with respect to the period of said applied signal to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected.

4. A cathode-ray type indicating arrangement comprising, a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, a signal generator for supplying oscillations having a periodicity short with respect to the period of said applied signal, means for utilizing said oscillations to produce an alternating magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected.

5. A cathode-ray type indicating arrangement comprising a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, a signal generator for supplying oscillations having a periodicity short with respect to the period of said applied signal, a winding disposed about said cathode-ray tube and excited by said oscillations for producing an alternating magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected.

6. A cathode-ray type indicating arrangement comprising, a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, means for producing a magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected, and means for developing a control effect having a predetermined frequency relation with reference to said cyclical displacements for controlling the brightness of predetermined portions of said signal patterns traced by said device.

7. A cathode-ray type indicating arrangement comprising, a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, means for producing a magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected, and means for developing a control effect having a frequency corresponding to twice the frequency of the cyclical displacement of any signal pattern traced by said device for controlling the brightness of predetermined portions of said signal patterns traced by said device.

8. A cathode-ray type indicating arrangement comprising, a cathode-ray tube line-tracing device, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, a signal generator for supplying oscillations having a periodicity short with respect to the period of said applied signal, means for utilizing said oscillations to produce an alternating magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected, and means including a full-wave rectifier for developing from said oscillations a control effect having a frequency corresponding to twice the frequency of said cyclical displacements for controlling the brightness of predetermined portions of said signal patterns traced by said device.

9. A cathode-ray type indicating arrangement comprising, a cathode-ray tube line-tracing device having a control electrode, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, a signal generator for supplying oscillations of sinusoidal wave form having a periodicity short with respect to the period of said applied signal, means for utilizing said oscillations to produce an alternating magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected, means including a full-wave rectifier for developing a control signal having peak amplitude values occurring in time coincidence with the peak amplitude values of said oscillations, and means for applying said control signal to said control electrode of said cathode-ray tube to control the brightness of predetermined portions of said signal patterns traced by said device.

10. A cathode-ray type indicating arrangement comprising, a cathode-ray tube line-tracing device having a control electrode, means for normally controlling the cathode ray of said device to trace a predetermined line, means responsive to the amplitude of an applied signal having an axis of substantial symmetry for shifting the line traced by said device in accordance therewith to trace a signal pattern having a corresponding axis of substantial symmetry, a signal generator for supplying oscillations of sinusoidal wave form having a periodicity short with respect to the period of said applied signal, a winding disposed about said cathode-ray tube and excited by said oscillations for producing an alternating magnetic field for cyclically effecting equal and opposite incremental displacements of any signal pattern traced by said device to cause said device to trace a pair of intersecting patterns the intersections of which sharply indicate said axis of symmetry, said magnetic field having the same law of distribution over areas which are symmetrically spaced on opposite sides of the axis of symmetry indicated by any of said traced signal patterns and in which areas said incremental displacements are effected, means including a full-wave rectifier having an input circuit magnetically coupled to said winding for developing a control signal having peak amplitude values occurring in time coincidence with the peak amplitude values of said oscillations, and means for applying said control signal to said control electrode of said cathode-ray tube to control the brightness of predetermined portions of said signal patterns traced by said device.

JAMES F. CRAIB.

REFERENCES CITED

The following references are of record in the file of this patent:

UNITED STATES PATENTS

| Number | Name | Date |
|---|---|---|
| 2,263,377 | Busignies et al. | Nov. 18, 1941 |
| 2,407,281 | Johnson et al. | Sept. 10, 1946 |